R. C. MEADOWS.
SCREEN SHOE FEED FOR CORN AND FEED MILLS.
APPLICATION FILED MAY 14, 1920.
1,363,425. Patented Dec. 28, 1920.
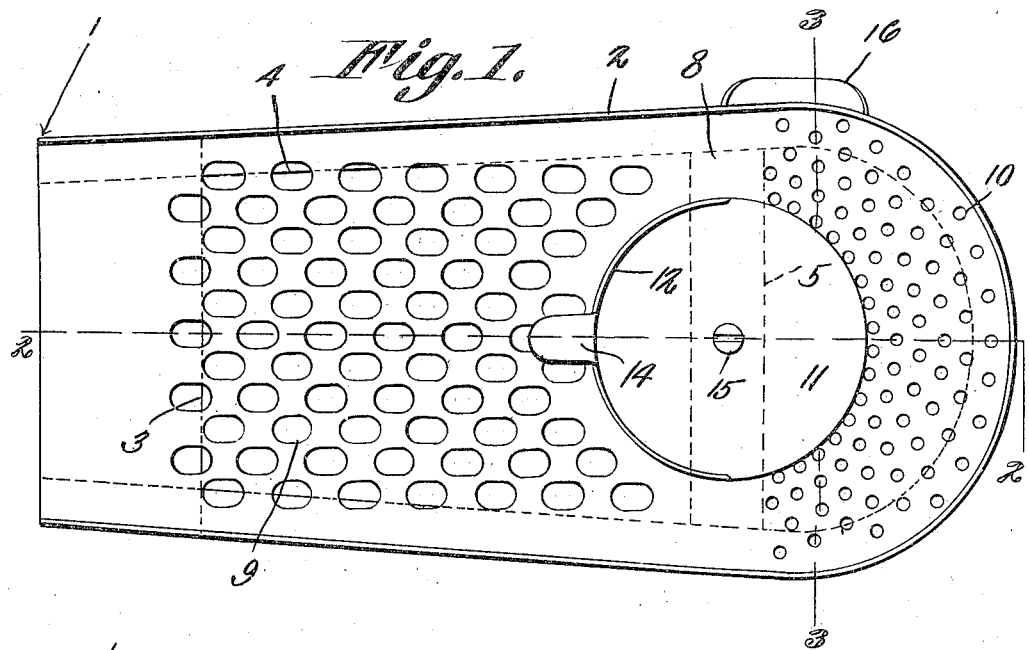
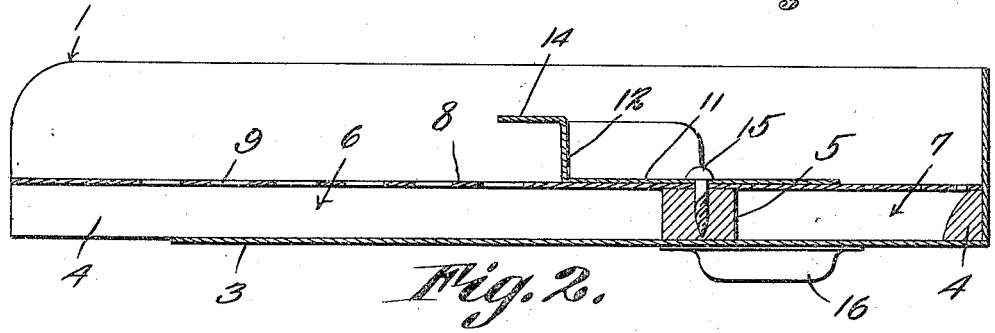
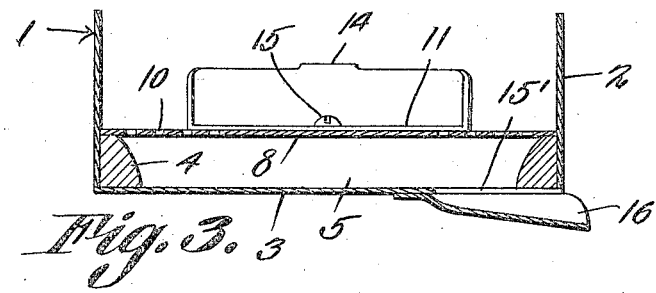
Witness
Inventor,
R. C. Meadows
By
Attorneys

UNITED STATES PATENT OFFICE.

ROBERT C. MEADOWS, OF PORES KNOB, NORTH CAROLINA.

SCREEN-SHOE FEED FOR CORN AND FEED MILLS.

1,363,425.     Specification of Letters Patent.     Patented Dec. 28, 1920.

Application filed May 14, 1920. Serial No. 381,342.

*To all whom it may concern:*

Be it known that I, ROBERT C. MEADOWS, a citizen of the United States, residing at Pores Knob, in the county of Wilkes and State of North Carolina, have invented a new and useful Screen-Shoe Feed for Corn and Feed Mills, of which the following is a specification.

The device forming the subject matter of this application is a shoe for corn and feed mills, and the invention aims to provide a simple means whereby grain of different sizes may be screened in a single shoe.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown may be made without departing from the spirit of the invention.

In the accompanying drawings:—

Figure 1 shows in top plan, a device constructed in accordance with the invention; Fig. 2 is a section on the line 2—2 of Fig. 1; and Fig. 3 is a section on the line 3—3 of Fig. 1, the deflector remaining in section.

In the drawing, there is shown a shoe of the sort used in connection with corn feed mills. The grain, along with foreign substances which may happen to be therein, is deposited on the shoe, the shoe being mounted for reciprocation. The foreign matter is segregated from the grain, and the grain, having been screened, is delivered by the shoe into the mill, to be ground.

The shoe comprises a casing 1 including an upstanding wall 2 which is U-shaped in top plan, the casing including a bottom 3. A U-shaped spacer 4 extends around the wall 2 and rests on the bottom 3. A partition 5 connects opposite portions of the spacer 4, to define separate chambers 6 and 7. A screen rests upon the spacer 4 and the partition 5, the screen being denoted by the numeral 8. The screen has two sets of openings, one set, denoted by the numeral 9, discharging into the chamber 6, the other set of openings denoted by the numeral 10, discharging into the chamber 7. The numeral 11 marks a deflector, preferably in the form of a plate or disk, and of circular outline if desired. A flange 12 upstands from the deflector 11 and is located at the periphery thereof, the flange extending but part way around the deflector. That portion of the screen 8 which lies between the openings 9 and the openings 10 preferably is imperforate, and it is upon this imperforate portion of the screen that the deflector 11 is located.

A pivot element 15 passes through the deflector 11 and through the screen 8, the pivot element being mounted in the partition 5. The flange 12 of the deflector 11 is supplied with a handle 14 whereby the deflector may be rotated.

The relative sizes of the openings 9 and 10 will, of course, be governed by the material to be screened. Suppose, however, that corn is to be handled. Then, the openings 9 are just large enough to permit a grain of corn to pass, the openings 10 being too small to permit the passage of a grain of corn. The deflector 11 is rotated until the flange 12 is adjacent to the openings 9, the deflector then discharging toward the openings 10. The corn, striking the deflector 11 is directed upon that portion of the screen which is provided with the openings 10. The corn does not pass through the openings 10, but the small foreign matter does pass through the said opening, into the chamber 7, and leaves the shoe by way of an opening 15 in the bottom 3, the opening discharging into a lateral chute 16. The corn, proceeding forwardly passes through the openings 9, the large foreign matter, such as nails and the like being screened out, the corn passing along the bottom 3 into the mill.

Let it be supposed, however, that some grain such as rye is to be screened, the rye being small enough so that it can pass through the openings 10. Then, the deflector 11 is rotated until the flange 12 is adjacent to the openings 10, the deflector discharging toward the openings 9. The coarser foreign material is screened out, when the rye passes downwardly through the openings 9. Since the deflector 11 has been rotated so as to discharge toward the openings 9, to the exclusion of the openings 10, the rye cannot pass through the openings and be wasted or discharged through the chute 16. The device is so constructed that it permits a relatively large grain, such as corn to be double-screened, without, however, preventing the screening of a relatively small grain such as rye.

Having thus described the invention, what is claimed is:—

1. A feed shoe comprising a casing having separate chambers; a screen having sets of openings of different sizes, the openings of one size discharging into one chamber, and the openings of the other size discharging into the other chamber; a deflector provided with means for directing material toward one set of openings to the exclusion of the other set of openings; and means for mounting the deflector on the shoe for reversal, whereby the deflector may discharge into either set of openings at the will of an operator.

2. A feed shoe comprising a casing having separate chambers; a screen having sets of openings of different sizes, the openings of one size discharging into one chamber, and the openings of the other size discharging into the other chamber; a deflector provided with means for directing material toward one set of openings, to the exclusion of the other set of openings; and means for mounting the deflector for rotation on the screen, whereby the deflector may discharge into either set of openings at the will of an operator.

In testimony that I claim the foregoing as my own, I have hereto affixed my signature in the presence of two witnesses.

ROBERT C. MEADOWS.

Witnesses:
WEDDY C. HENDREN,
GRACE C. MEADOWS.